United States Patent
Vernooy

(10) Patent No.: US 6,970,623 B2
(45) Date of Patent: Nov. 29, 2005

(54) FIBER-OPTIC-TAPER LOOP PROBE FOR CHARACTERIZING OPTICAL COMPONENTS FOR TRANSVERSE OPTICAL COUPLING

(75) Inventor: David W. Vernooy, Sierra Madre, CA (US)

(73) Assignee: Xponent Photonics Inc, Monrovia, CA (US)

(*) Notice: Subject to any disclaimer, the term of this patent is extended or adjusted under 35 U.S.C. 154(b) by 338 days.

(21) Appl. No.: 10/243,976

(22) Filed: Sep. 13, 2002

(65) Prior Publication Data

US 2003/0053735 A1 Mar. 20, 2003

Related U.S. Application Data

(60) Provisional application No. 60/322,272, filed on Sep. 13, 2001.

(51) Int. Cl.[7] .................................. G02B 6/26
(52) U.S. Cl. .................. 385/43; 385/12; 385/30; 385/13
(58) Field of Search ............... 385/43, 9, 12, 385/13, 15, 16, 31, 30

(56) References Cited

U.S. PATENT DOCUMENTS

| | | | |
|---|---|---|---|
| 4,120,588 A | * | 10/1978 | Chaum ............... 356/460 |
| 4,852,117 A | * | 7/1989 | Po ..................... 372/97 |
| 5,101,453 A | | 3/1992 | Rumbaugh |
| 5,138,676 A | | 8/1992 | Stowe et al. |
| 5,436,454 A | | 7/1995 | Bornstein et al. |
| 5,532,493 A | | 7/1996 | Hale et al. |
| 5,787,053 A | * | 7/1998 | Ames et al. ......... 367/149 |
| 5,809,189 A | | 9/1998 | Murphy et al. |
| 6,677,576 B1 | * | 1/2004 | Kenny et al. ........ 250/227.14 |
| 2003/0219193 A1 | * | 11/2003 | Litvin ................ 385/15 |

FOREIGN PATENT DOCUMENTS

WO  WO-00-17608 A1  3/2000

OTHER PUBLICATIONS

T. Dimmick, G. Kakarantzas, T. Birks and P. St. J. Russell, "Carbon Dioxide laser fabrication of fused-fiber couplers and tapers", Applied Optics 38 6845 (1999).

* cited by examiner

Primary Examiner—Kianni Kavesh
Assistant Examiner—[0002] Kianni
(74) Attorney, Agent, or Firm—David S. Alavi; Scott R. Miller; Christie Parker & Hale LLP

(57) ABSTRACT

A fiber-optic-taper loop probe includes first and second fiber segments, first and second tapering segments, and a center taper segment. In a preferred embodiment, first and second fiber segments are about 125 μm in diameter, and the center taper segment has a substantially constant diameter of about 2–5 μm. The fiber-optic taper forms a loop, the center taper segment remaining substantially straight and opposite the crossing point of the loop. The loop is secured to a support structure to maintain its shape and facilitate positioning relative to an optical component to be tested. The fiber segments may be connected to an optical characterization system including one or more light sources, lasers, detectors, spectrometers, etc. The geometry of the loop enables transverse-optical-coupling of the loop probe with an optical component without undesirable contact between other portions of the loop probe and other portions of the optical component and/or substrate.

9 Claims, 5 Drawing Sheets

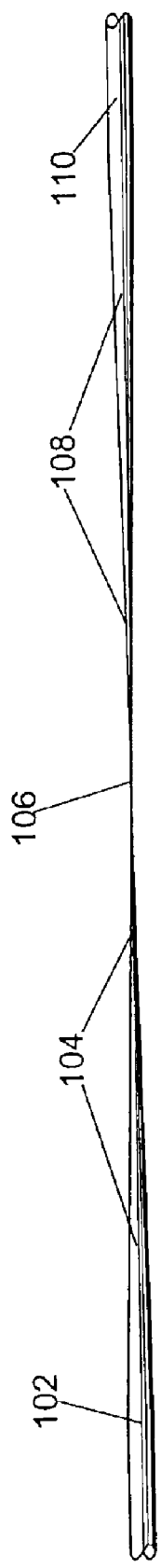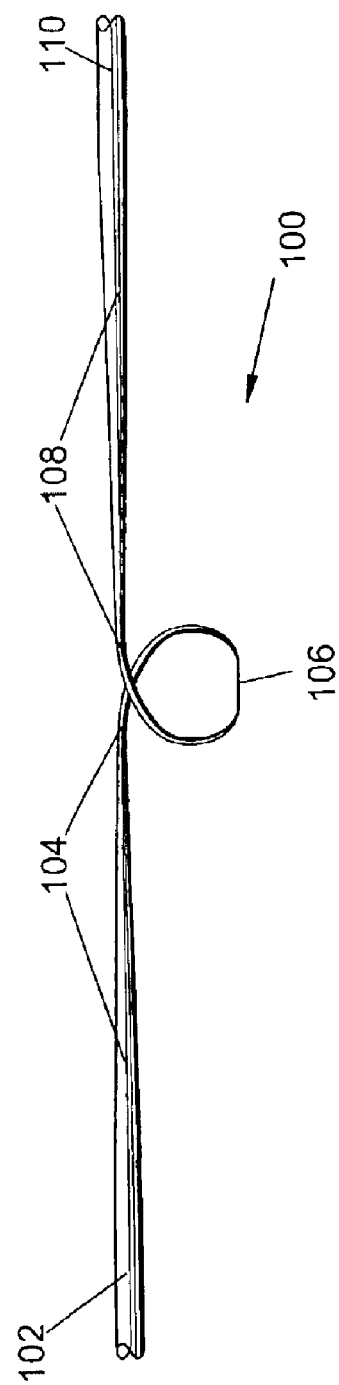

FIBER-OPTIC-TAPER LOOP PROBE FOR CHARACTERIZING OPTICAL COMPONENTS FOR TRANSVERSE OPTICAL COUPLING

RELATED APPLICATIONS

This application claims benefit of prior filed co-pending provisional App. No. 60/322,272 entitled "Fiber-optic-taper probe for characterizing transversely-optically-coupled waveguides and resonators" filed Sep. 13, 2001 in the name of David W. Vernooy, said provisional application being hereby incorporated by reference as if fully set forth herein.

FIELD OF THE INVENTION

The field of the present invention relates to optical device characterization. In particular, apparatus and methods are described herein for characterizing optical components adapted for transverse optical coupling.

BACKGROUND

This application is related to subject matter disclosed in:

A1) U.S. provisional App. No. 60/257,218 entitled "Waveguides and resonators for integrated optical devices and methods of fabrication and use thereof" filed Dec. 21, 2000 in the name of Oskar J. Painter;

A2) U.S. non-provisional application Ser. No. 09/788,303 entitled "Cylindrical processing of optical media" filed Feb. 16, 2001 in the names of Peter C. Sercel, Kerry J. Vahala, David W. Vernooy, and Guido Hunziker;

A3) U.S. non-provisional application Ser. No. 09/788,331 entitled "Fiber-ring optical resonators" filed Feb. 16, 2001 in the names of Peter C. Sercel, Kerry J. Vahala, David W. Vernooy, Guido Hunziker, and Robert B. Lee;

A4) U.S. non-provisional application Ser. No. 09/788,300 entitled "Resonant optical filters" filed Feb. 16, 2001 in the names of Kerry J. Vahala, Peter C. Sercel, David W. Vernooy, Oskar J. Painter, and Guido Hunziker;

A5) U.S. non-provisional application Ser. No. 09/788,301 entitled "Resonant optical power control device assemblies" filed Feb. 16, 2001 in the names of Peter C. Sercel, Kerry J. Vahala, David W. Vernooy, Guido Hunziker, Robert B. Lee, and Oskar J. Painter;

A6) U.S. provisional App. No. 60/301,519 entitled "Waveguide-fiber Mach-Zender interferometer and methods of fabrication and use thereof" filed Jun. 27, 2001 in the names of Oskar J. Painter, David W. Vernooy, and Kerry J. Vahala;

A7) U.S. provisional App. No. 60/322,272 entitled "Fiber-optic-taper probe for characterizing transversely-optically-coupled waveguides and resonators" filed Sep. 13, 2001 in the name of David W. Vernooy, said provisional application being hereby incorporated by reference as if fully set forth herein;

A8) U.S. provisional App. No. 60/335,656 entitled "Polarization-engineered transverse optical coupling apparatus and methods" filed Oct. 30, 2001 in the names of Kerry J. Vahala, Peter C. Sercel, Oskar J. Painter, David W. Vernooy, and David S. Alavi;

A9) U.S. non-provisional application Ser. No. 10/037,146 entitled "Resonant optical modulators" filed Dec. 21, 2001 in the names of Oskar J. Painter, Peter C. Sercel, Kerry J. Vahala, David W. Vernooy, and Guido Hunziker;

A10) U.S. non-provisional application Ser No. 10/037,966 entitled "Multi-layer dispersion-engineered waveguides and resonators" filed Dec. 21, 2001 in the names of Oskar J. Painter, David W. Vernooy, and Kerry J. Vahala;

A11) U.S. provisional App. No. 60/334,705 entitled "Integrated end-coupled transverse-optical-coupling apparatus and methods" filed Oct. 30, 2001 in the names of Henry A. Blauvelt, Kerry J. Vahala, Peter C. Sercel, Oskar J. Painter, and Guido Hunziker;

A12) U.S. provisional App. No. 60/333,236 entitled "Alignment apparatus and methods for transverse optical coupling" filed Nov. 23, 2001 in the names of Charles I. Grosjean, Guido Hunziker, Paul M. Bridger, and Oskar J. Painter;

A13) U.S. provisional App. No. 60/360,261 entitled "Alignment-insensitive optical junction apparatus and methods employing adiabatic optical power transfer" filed Feb. 27, 2002 in the names of Henry A. Blauvelt, Kerry J. Vahala, David W. Vernooy, and Joel S. Paslaski;

A14) U.S. non-provisional application Ser. No. 10/187,030 entitled "Optical junction apparatus and methods employing optical power transverse-transfer" filed Jun. 28, 2002 in the names of Henry A. Blauvelt, Kerry J. Vahala, David W. Vernooy, and Joel S. Paslaski;

P1) "Carbon Dioxide laser fabrication of fused-fiber couplers and tapers", T. Dimmick, G. Kakarantzas, T. Birks and P. St. J. Russell, Applied Optics 38, 6845 (1999); and U.S. Pat. No. 5,101,453 entitled "Fiber Optic Wafer Probe" issued Mar. 31, 1992 in the name of assignee Cascade Microtech.

With the development of techniques for efficient transverse-transfer of optical power between a fiber-optic taper and an optical waveguide fabricated on a substrate (including, for example: semiconductor-based optical DBR waveguides or resonators, as in applications A1, A6, A8, and A10 cited above; external-transfer waveguides integrated with optical devices, as in applications A11, A13, and A14 cited above; methods and apparatus disclosed herein may be suitable for other transversely-optically-coupled optical components as well), the need arises for wafer-scale fiber-taper-based optical testing probes. Free space-to-chip or cleaved-fiber-to-chip (e.g. "butt" coupling or "end-fire" coupling) testing techniques may be practically dismissed as too cumbersome, too inefficient, and generally unsuitable for large-scale (i.e., many optical devices per substrate) testing rigs.

Since the optical components to be tested are intended to be transversely-optically-coupled to one or more other optical components (often including a fiber-optic taper) of a packaged device, it is important that pre-characterization and/or pre-qualification of the optical structures be performed under similar conditions, e.g., transversely optically coupled to a fiber-optic taper. Transverse optical coupling may also be referred to as evanescent optical coupling or optical power transverse-transfer, and is described in detail in patent applications A1 through A14. A difficulty with straight-taper-based testing is essentially determined by geometry. A typical fiber-optic taper diameter decreases from about 125 $\mu$m to about 2.5 $\mu$m in a length of about 30 mm. A typical ridge waveguide may extend only about 3–4 $\mu$m above the substrate. Efficient coupling typically requires contact between the taper and ridge waveguide. Assuming the tapering segment of the fiber has a diameter decreasing roughly linearly with distance, then the overall substrate width should be less than about 500 $\mu$m so that the larger diameters of the tapering segment of the fiber do not interfere with the placement of the thinnest center taper segment on the ridge waveguide.

In practice it has proven difficult, on samples wider than about 500 µm, to establish transverse optical coupling between the thinnest segment of the taper and a ridge or planar waveguide on the substrate, while avoiding contact between larger-diameter segments of the fiber and the substrate. As a result, reliable and/or repeatable coupling of the taper and the waveguide for testing is nearly impossible using a straight taper and an uncleaved substrate. Furthermore, even in cases where the geometry is marginally favorable, incidental contact of the larger portions of the taper and the substrate can cause additional insertion loss for the device being tested. From both reliability and performance standpoints, it is desirable to avoid any unnecessary contact of the tapered section of the optical fiber with the substrate.

This imposes extreme constraints on preparation techniques for a multiple-waveguide sample before it can be optically characterized. For example, at the very least scribe-and-break techniques are necessary prior to mounting the substrate sample in order to test the optical quality of the waveguides fabricated thereon. In extreme cases, lapping and cleaving may be required in order to ensure accurate sample preparation (e.g., flat end facets) and maximization of chip yield. While both of these techniques tend to introduce particulates onto the wafer substrate at a very late stage in the processing, this is not the most important problem associated with the need to subdivide the wafer for optical testing. It is of utmost importance to pre-test and pre-qualify the optical quality of the guides in a manner as rapid, accurate, and preferably automated as practicable before beginning the labor-intensive process of subdividing the chip substrate.

As an alternative solution to the problem of contact between the optical fiber and the substrate, one or more "trenches" or other similarly depressed spatial regions may be provided on the substrate near the optical components to be tested. Such depressed regions may reduce or eliminate contact between the tapering portions of the optical fiber and the substrate. Such regions may be provided near each of multiple optical components fabricated on a common substrate. Such a solution entails the added effort and expense of the additional fabrication steps to produce the depressed regions on the substrate, and the necessarily reduced ultimate yield of qualified optical components.

It is highly desirable, perhaps essential, that an optical probe not interfere with or limit testing of other aspects of a waveguide device on a substrate. For example, the optical guide may form part of an active optical device (e.g., modulator, laser, detector, etc) for which DC (parametric) electrical, high speed (RF, microwave) electrical, thermal, and/or mechanical testing may be required, concurrently with optical testing and/or at a later stage. Furthermore, an optical probe should be mechanically compact and stable, preferably should not interfere with cameras or microscopes used in automated image recognition, and preferably may be integrated with standard electro-mechanical positioning stages. It is highly desirable to use the considerable commercial infrastructure already in place for automated testing. Hence, compatibility of the optical probe with such machinery is extremely important.

It should be noted that a commercial vendor (Cascade Microtech) supplies probing heads for standard optical probe stations under the name "fiber optic probes" (U.S. Pat. No. 5,101,453). This probe is typically used for on-wafer testing of VCSEL devices and, with some modifications, stripe lasers and laser bars. These probes are essentially cleaved fibers mounted on a standard probe station head and would perform essentially as "butt-coupled" or "end-fire" fiber probes for the present application. Butt coupling is not suitable for testing transversely-optically-coupled components according to the present invention, and the prior probes are not suitable for transverse optical coupling.

It is therefore desirable to provide apparatus and methods for optically characterizing transverse-coupled waveguides, resonators, and/or other optical components, particularly transverse-coupled components on substantially planar substrates (including substrates greater than a millimeter across). It is desirable to provide such apparatus and methods that may be implemented for characterizing many optical components on a common wafer-scale substrate, the components being adapted for transverse optical coupling.

SUMMARY

Certain aspects of the present invention may overcome one or more drawbacks of the previous art and/or advance the state-of-the-art of apparatus and methods for optical characterization.

A fiber-optic-taper loop probe implemented according to the present invention includes a first fiber segment, a first tapering segment, a center taper segment, a second tapering segment, and a second fiber segment. The first and second fiber segments have a transverse optical fiber diameter substantially corresponding to the optical fiber prior to pulling the taper (usually about 125 µm; core plus cladding). The center taper segment substantially corresponds to the minimum diameter of the taper (usually about 1–5 µm). The fiber-optic taper is formed into a loop, with the center taper segment remaining substantially straight and positioned opposite the crossing point of the loop. The loop may be secured to a support structure to maintain its shape and facilitate its positioning relative to an optical component to be tested. The first and second fiber segments may be connected to an optical characterization system that may include one or more light sources, lasers, detectors, spectrometers, and so forth. The geometry of the loop enables transverse-optical-coupling of the loop probe to an optical component adapted therefor and positioned on a substrate without undesirable contact between other portions of the loop probe and other portions of the optical component and/or substrate.

Additional objects and advantages of the present invention may become apparent upon referring to the preferred and alternative embodiments of the present invention as illustrated in the drawings and described in the following written description and/or claims.

BRIEF DESCRIPTION OF THE DRAWINGS

FIGS. 1A and 1B show a fiber-optic taper formed into a loop according to the present invention.

Figure 2:
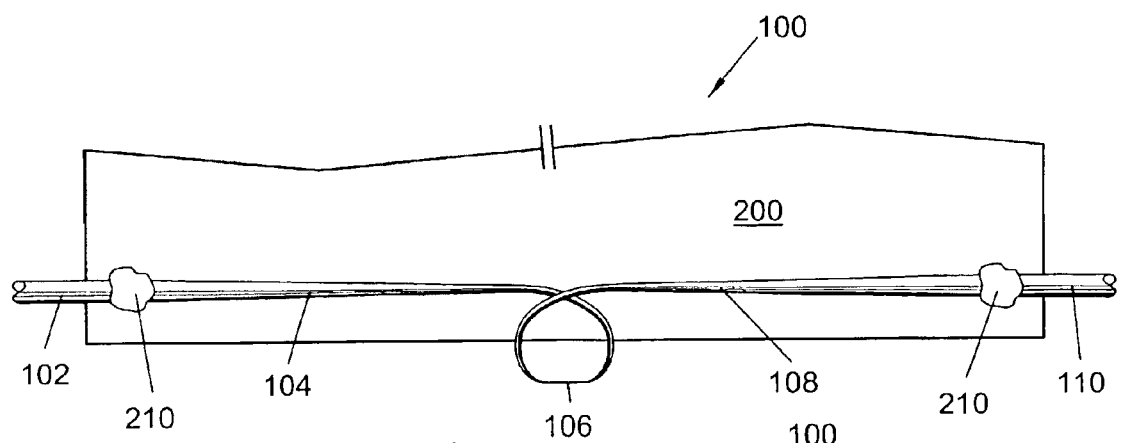
FIG. 2 shows a mounted fiber-optic-taper loop according to the present invention. (glue)

It should be noted that the relative proportions of various structures shown in the Figures may be distorted to more clearly illustrate the present invention. In particular, transverse dimensions of the fiber-optic tapers are generally exaggerated relative to the longitudinal dimensions. Size differentials, taper angles and/or lengths, curvatures, loop diameters, and so on may also be distorted for clarity and/or illustrative purposes. The text and incorporated references should be relied on for the appropriate dimensions and/or proportions of structures shown herein.

DETAILED DESCRIPTION OF EMBODIMENTS

FIGS. 1 through 4 generally illustrate a fiber-optic-taper probe 100 according to the present invention. The probe includes (in order along the length of the optical fiber) a first fiber segment 102, a first tapering segment 104, a center taper segment 106, a second tapering segment 108, and a second fiber segment 110. The transverse fiber diameters of the first and second fiber segments 102 and 110 are substantially the same as the transverse optical fiber diameter before pulling the taper (about 125 $\mu$m for the core and cladding of typical single-mode optical fiber, for example; other diameters may be equivalently employed). The first and second tapering segments 104 and 108 decrease in diameter from the first and second fiber segments, respectively, toward the center taper segment 106. The diameter of the center taper segment 106 substantially corresponds to the minimum diameter of the fiber-optic-taper probe (typically less than 10 $\mu$m, often as small as 1–3 $\mu$m or even less in diameter; any suitable minimum taper diameter may be employed). A typical fiber-optic taper narrows from about 125 $\mu$m down to a few $\mu$m over a distance of about 20–30 mm (i.e., the length of tapering segment 104 or 108). Center taper segment 106 is typically between about 0.5 mm and 1 mm in length. Fiber-optic tapers having other suitable segment lengths may be equivalently employed. It should be noted that the various segments of the optical fiber referred to herein are not sharply demarcated, but transition smoothly (i.e., substantially adiabatically) from one to the next, and it is typically not possible to unambiguously define a point at which one segment ends and the next one begins (for example, the transition between the first tapering segment and the center taper segment may not be readily assigned a specific location along the optical fiber). The fiber-optic taper changes from an essentially single-mode structure (optical mode confined near a core and weakly guided by a cladding layer in fiber segments 102 and 110) to a multi-mode structure (optical mode confined near the center taper segment 106 and strongly guided by air). The transition is preferably substantially adiabatic over tapering segments 104 and 108 and center taper segment 106 (i.e., sufficiently gradual so as to substantially avoid coupling into additional optical modes).

When formed into a loop probe according to the present invention, center taper segment 106 typically remains substantially straight, and is the portion of the loop probe that establishes transverse optical coupling with a suitably adapted (for transverse optical coupling) component to be tested. First and second tapering segments 104 and 108 are curved to form a loop. The radii of curvature of first and second tapering segments 104 and 108 near center taper segment 106 are typically between about 0.1 mm and about 0.5 mm. The overall width of the loop may therefore be between about 0.7 mm and about 3 mm. The loop may therefore be sufficiently large so that negligible (or operationally acceptable) mode-coupling in induced at the crossing point of the loop. Such mode coupling decreases as the crossing point is moved further from the center taper segment (i.e., as the loop is made larger), but too large a loop limits the substrate component density for which the loop probe could be used for testing. Other curvatures may be equivalently employed, and radii of curvature less than 60 $\mu$m have been achieved with fiber-optic tapers etched to reduce the taper diameter (therefore reducing mode coupling that might occur at the crossing point). The degree of curvature of tapering segment 104 or 108 generally decreases with increasing distance from center taper segment 106 along the fiber-optic taper, and may be substantially straight upon reaching first and second fiber segments 102 and 110, respectively. Fiber-segments 102 and 110 may be provided with fiber-optic connectors of any suitable type for connecting to a fiber-optic characterization system, which may include one of more light sources, lasers, detectors, spectrometers, spectrum analyzers, and so forth. Alternatively, fiber-segments 102 and 110 may be spliced directly into the fiber-optic characterization system, if desired.

The fiber-optic-taper probe 100 may preferably be formed immediately after pulling the fiber-optic taper, or alternatively may be formed from a pre-made fiber-optic taper. Standard techniques (as disclosed in publication P1 of Dimmick et al cited hereinabove, for example) may be used to heat and pull an optical fiber to form the fiber-optic taper. After the pulling process, the fiber-optic taper is held under tension between a pair of clamps mounted on motorized translation stages. The stages are moved back toward one another, and the taper naturally tends to kink back upon itself and form a loop. Once a loop has formed, the ends of the tapered optical fiber may than be pulled apart again to achieve a desired loop size and/or curvature. Any mechanical procedure yielding a loop in the optical fiber may be equivalently employed.

Figure 3:
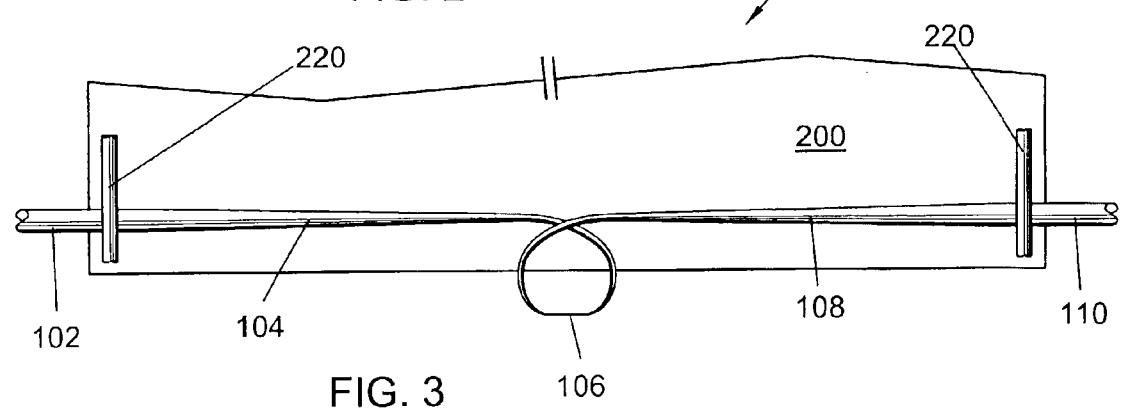
FIG. 3 shows a mounted fiber-optic-taper loop according to the present invention. (clamp)

Once formed, the loop must be secured to a support structure of some sort to maintain the loop and facilitate positioning of the probe during use thereof (FIGS. 2 and 3). A preferred support structure 200 may include a plate, slide, or similar structure with the loop secured near an edge so that the loop extends beyond the edge. The fiber-optic taper may be glued, clamped, or otherwise secured to the support structure at several points along the fiber-optic taper. Tapering segments 104 and 108 should preferably be substantially avoided when securing the loop so as not to degrade the optical performance of the fiber-optic taper by inducing unwanted coupling into additional optical modes. Perturbation caused by mounting may introduce undesired mode coupling and multi-path interference effects unless care is taken. Small drops 210 of epoxy or other suitable adhesive may be employed to secure the loop probe 100 to the support structure 200, preferably on the fiber segments 102 and 110 (where cladding is still present and negligible perturbation may occur). An additional drop of adhesive may be placed at the crossing point of the loop, if needed or desired, and if unwanted mode coupling may be maintained below operationally acceptable levels.

Figure 4:
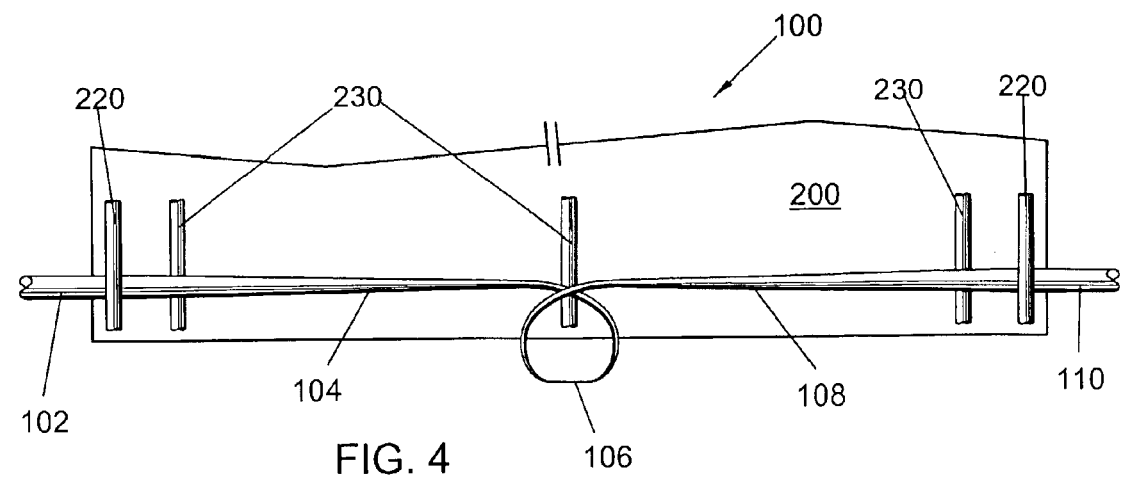
FIG. 4 shows a mounted fiber-optic-taper loop according to the present invention. (spacer)

Alternatively, clamps or other mechanical retaining structures 220 may be employed to hold the loop probe 100 onto support structure 200. A preferred clamp 220 may include a short length of optical fiber laid over the loop probe 100 and secured to the support structure 200. The fiber clamp is preferably oriented substantially perpendicular to the fiber-optic taper so as to minimize potential clamp-induced degradation of optical performance of the taper (via coupling into unwanted optical modes of the fiber or the clamp, if any). Other structures may be equivalently employed as a clamp. It may also be desirable to employ spacers 230 for displacing the loop probe 100 from the support structure 200 so as to reduce potential support-structure-induced degradation of optical performance of the fiber-optic taper (via coupling into unwanted optical modes of the fiber or the support structure, if any; FIG. 4). Short lengths of optical fiber secured to the support structure 200 may be employed for this purpose, preferably oriented substantially perpendicular to the fiber-optic taper so as to minimize potential spacer-induced degradation of optical performance of the fiber-optic taper (via coupling into unwanted optical modes of the fiber or spacer, if any). Whichever way is chosen for securing the loop probe 100 to the support structure 200, the result is a mechanically stable and robust device that will last at least several months under heavy use in an optical laboratory environment.

Figure 5A:
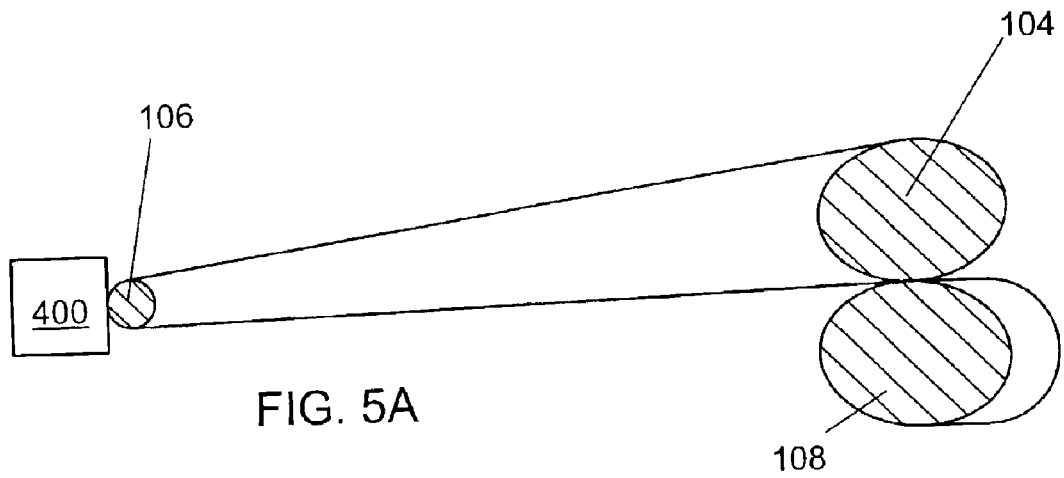
FIGS. 5A, 5B, and 5C show cross-sections of a fiber-optic-taper loop probe transversely-optically-coupled to an optical component according to the present invention.
Figure 5B:
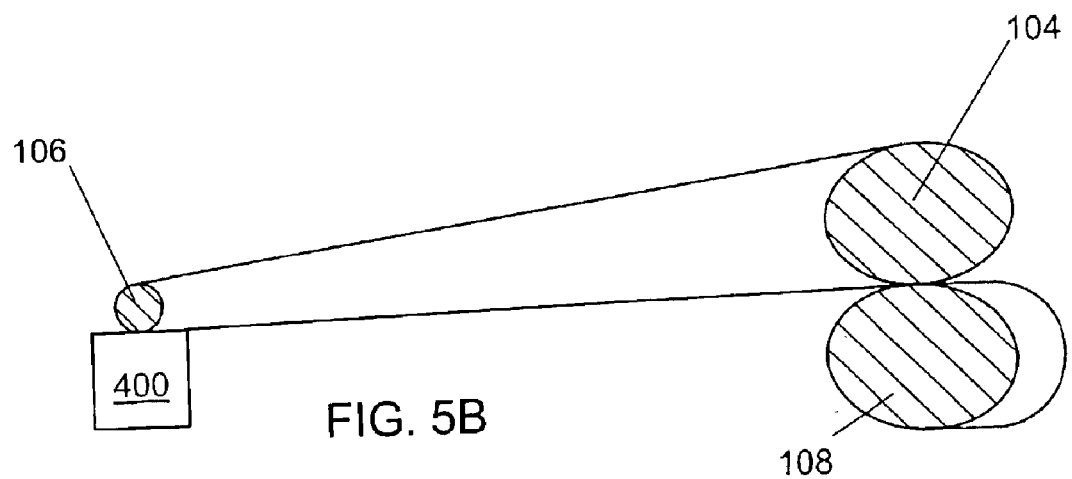
Figure 5C:
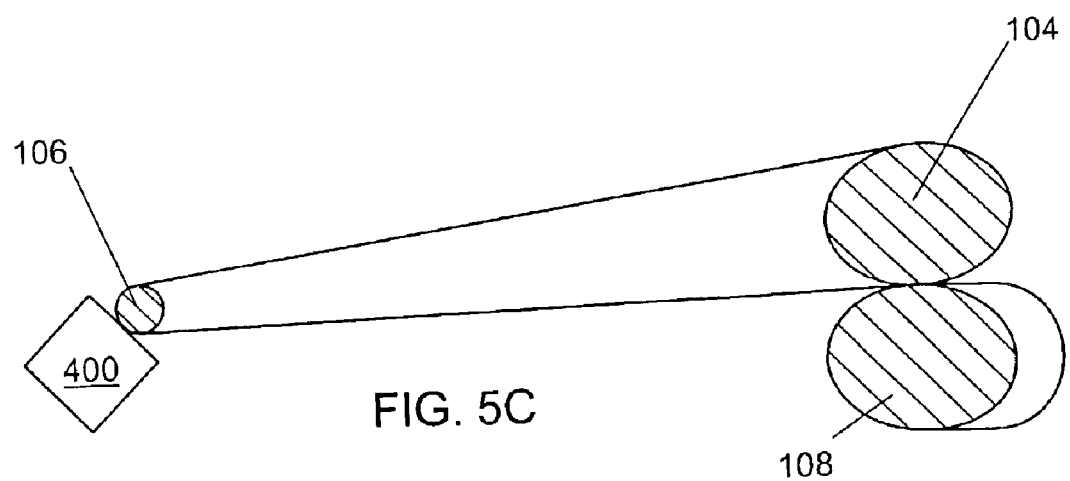

For use as a probe to characterize transversely-optically-coupled optical components, the fiber-optic-taper loop probe 100 may preferably be mounted on a positioner via support structure 200, enabling accurate 3-axis translational positioning of the loop probe 100 relative to an optical component 400 to be characterized. Alternatively, the optical component 400 may be mounted on a positioner, or both loop probe and optical component may each be mounted on a corresponding positioner so as to provide 3-axis relative translational motion therebetween. Relative angular motion between the loop probe and optical component 400 may also be provided by the positioner(s) so as to enable relative positioning of the optical component 400 in the plane of the loop probe and radially adjacent center taper segment 106 (FIG. 5A), out of the plane of the loop and axially adjacent center taper segment 106 (FIG. 5B), or at an intermediate position (FIG. 5C). FIGS. 5A, 5B, and 5C are cross sections through the symmetry axis of the loop and viewed along the direction of light propagation through center taper segment 106. Relative positioning of the loop probe and optical component may preferably be performed under visualization using a microscope and video display or other similar device. Errors in relative positioning resulting in excessive pressure exerted by the optical component on the loop probe generally do not cause breakage of the probe due to its mechanical flexibility or "springiness". This flexibility also tends to render the measurements made using the loop probe somewhat insensitive to imprecise and/or unstable positioning of the loop probe and support structure relative to the optical component if contact optical coupling is desired. The ability to accurately position the loop probe relative to an optical component enables variable optical coupling between the loop probe and optical component being tested by allowing the loop probe to "hover" near the optical component (unlike the case of a straight taper probe, where contact is generally required to achieve reliable optical coupling). Separations on the order of 0.1 $\mu$m may be achieved with high-precision positioners and carefully cleaned taper and waveguide.

Figure 6A:
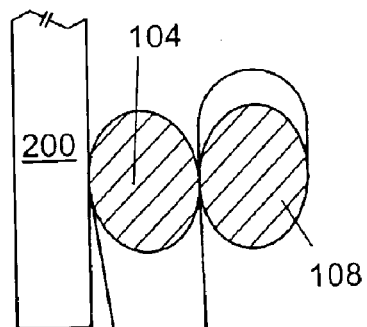
FIGS. 6A, 6B, and 6C show cross-sections of a fiber-optic-taper loop probe transversely-optically-surface-coupled to an optical component on a substrate according to the present invention.
Figure 6B:
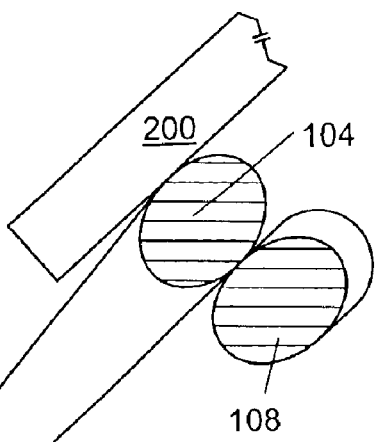
Figure 6C:
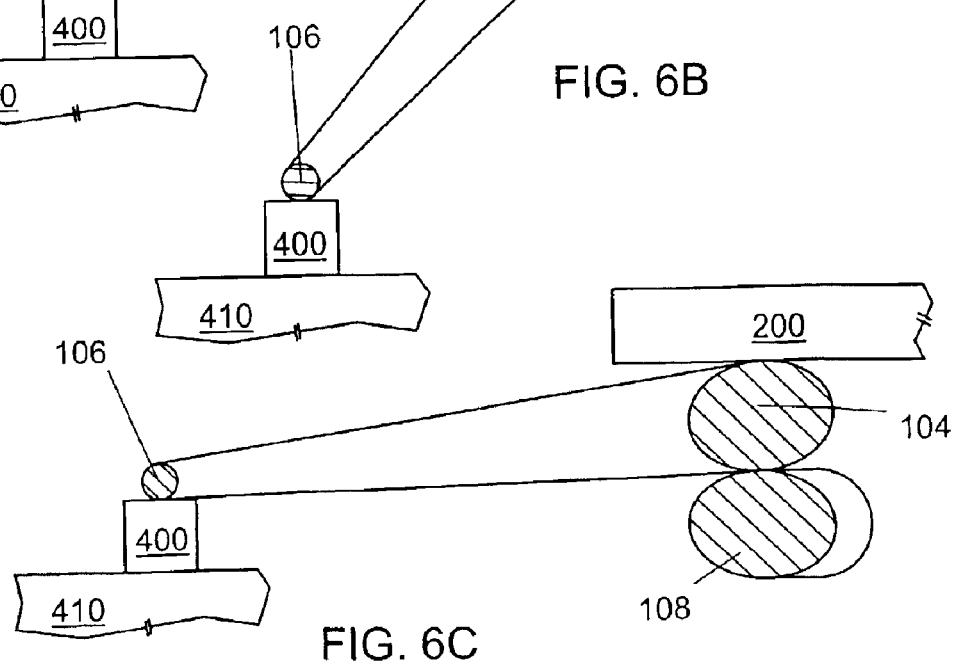
Figure 7A:
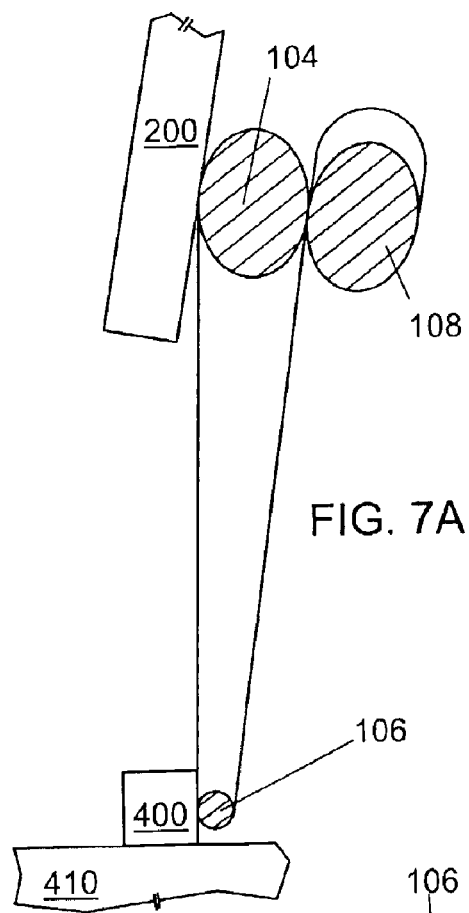
FIGS. 7A, 7B, and 7C show cross-sections of a fiber-optic-taper loop probe transversely-optically-side-coupled to an optical component on a substrate according to the present invention.
Figure 7B:
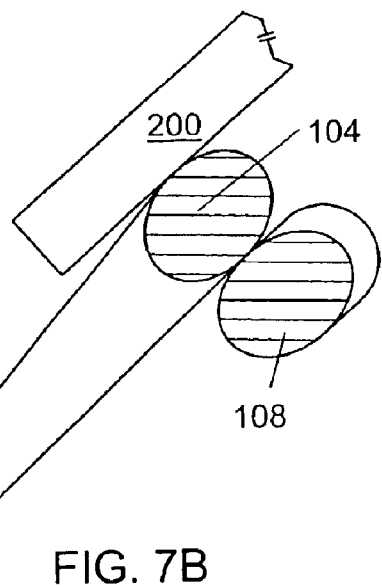
Figure 7C:
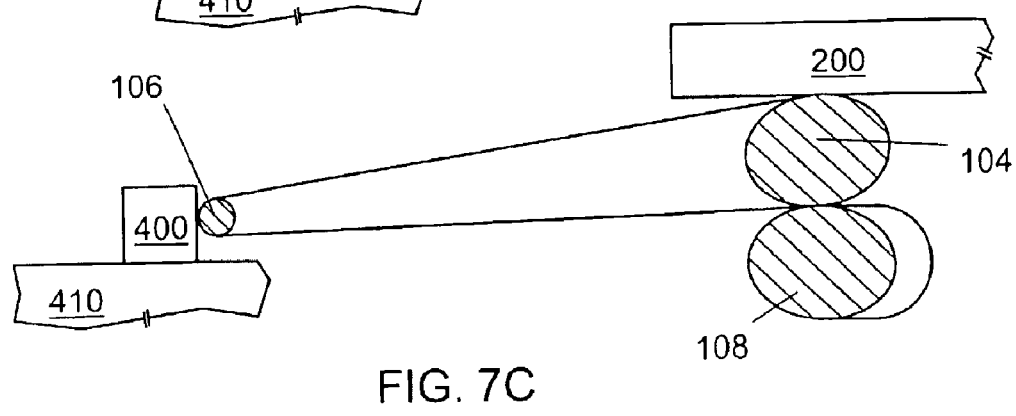

The small radii of curvature of the loop probe 100 relative to non-looped fiber-optic tapers enables transverse optical coupling to small (sub-millimeter) optical components without interference from surrounding structures. This feature is particularly advantageous for testing multiple optical components fabricated on a common substrate, including but not limited to: DBR waveguides and resonators fabricated on a semi-conductor substrate as disclosed in applications A1, A6, A8, and A10 cited hereinabove; external transfer waveguides integrated with optical devices as disclosed in applications A11, A13, and A14 cited hereinabove; silica waveguides; other dielectric waveguides; polymer waveguides; lithium niobate waveguides; other crystalline waveguides; combinations and equivalents thereof. The size and curvature of the loop probe enables transverse optical coupling to individual optical components having grid spacings on the substrate as small as 0.6 mm by 0.2 mm (equivalently, device density on the order of 6–10 components per mm$^2$). For testing optical components on substrates, the loop probe and support structure may be positioned so that the plane of the loop is substantially parallel to the substrate, substantially perpendicular to the substrate, or at an intermediate orientation (FIGS. 6A, 6B, 6C, 7A, 7B, and 7C). Transverse optical coupling between the optical component and the loop probe may be established at a top surface of the component (relative to the substrate; surface coupling; FIGS. 6A, 6B, and 6C), or may be established at a side surface of the optical component (side coupling; FIGS. 7A, 7B, and 7C). Since it is mechanically flexible, the loop probe may alternatively be wrapped or hooked around the optical component to establish an elongated and potentially variable transverse-optical-coupling interaction region between the loop probe and optical component. However, the interaction length for transverse coupling to a taper is typically determined by the waveguide geometry, since the taper is flexible. Alignment markings etched onto the substrate may be employed to facilitate alignment of the loop probe and optical components on the substrate. The loop probe may be used in conjunction with other tools and/or probes for characterizing components fabricated on the substrate along with the optical component, including but not limited to DC electronic probes, RF/microwave probes, heating elements, vacuum chucking mechanisms, micro-positioners, and so forth.

Once positioned for transverse optical coupling with an optical device, characterization may be carried out in a variety of ways. An optical source may be used to launch on optical input signal into the optical fiber loop probe, an electronic input signal may be applied to the device, or both. The device may be characterized by detection and analysis of an optical output signal from the optical fiber, detection and analysis of an electronic output signal measured from the device, or both. An output optical signal from the optical fiber may arise from an optical input signal propagating through the fiber past the device, directly from the device, or both. Any applied input signal may be modulated, swept, or otherwise varied, and an output signal may be analyzed, with respect to any relevant property of the input/output signal, including but not limited to: optical wavelength, optical power, optical bandwidth, optical temporal response, electronic signal level, electronic signal frequency, electronic temporal response, and/or any other relevant performance parameter. Analysis of optical input/output signals launched into the optical fiber and/or received from the optical fiber may be detected and analyzed with any suitable optical characterization equipment.

A fiber-optic-taper loop probe as disclosed herein offers significant advantages for optical characterization of transversely-optically-coupled optical components, particularly those that may be fabricated in large numbers on a single substrate. Using the fiber-optic-taper loop probe, individual optical components on the substrate may be pre-characterized and/or pre-qualified before the expensive and time-consuming steps of cleaving the substrate to isolate the individual optical components. Additionally, no polishing or other processing of the optical component is required to enable optical coupling to the device. The loop probe may be employed for optical components (both waveguides and resonators) of varying shape and topology, including simple straight segments, curved segments, rings, racetracks, and so on. Closed resonator structures that could be characterized using end-fire coupling techniques only with difficulty (or perhaps not at all) may be readily characterized using the loop probe. The loop probe may also be used with optical components that also include electrical contacts or other associated structures.

It should be appreciated that a fiber-optic-taper loop probe according to the present invention may be used for optical characterization of any transversely-optically-coupled optical component, including semiconductor waveguides and resonators, semiconductor DBR waveguides and resonators, external-transfer waveguides integrated with optical devices, fiber-ring resonators, micro-disk and micro-ring resonators, micro-sphere resonators, side-etched waveguides, silica and other dielectric waveguides, polymer waveguides, lithium niobate and other crystalline waveguides, other transversely-optically-coupled optical components as disclosed in earlier applications A1 through A14, and so on. It should also be appreciated that optical characterization using the loop probe may test both the suitability of the device for transverse coupling (particularly with a taper) as well as inherent functioning of the device. This is of particular utility for devices intended to be used in a transverse-coupled arrangement.

Various aqueous or non-aqueous solvents may be employed for cleaning a fiber-optic-taper loop probe. The loop probe tends to pick up particulates and/or contaminants in the course of use, and presence of such particulates and/or contaminants may degrade the optical performance of the loop taper. Aqueous hydrofluoric acid etching may be used for cleaning, and may also be used for etching to reduce the fiber-taper diameter of the loop probe and/or to enable smaller radii of curvature to be achieved. These may be needed or desired for probing smaller or more densely packed optical components.

Direct comparison of transverse optical coupling achievable using either the loop probe or the straight taper may be accomplished using an optical assembly including a resonator (preferably a racetrack-type resonator) fabricated on a substrate and coupled to both a loop probe and a straight fiber-optic taper. Both loop probe and straight taper may serve as either input and/or output for characterization of the overall assembly, and may enable testing of one or all of resonator performance, loop-to-resonator coupling, and/or straight taper-to-resonator coupling. Using this configuration it was determined that the optical performance of the loop probe was at least as good as that of the straight taper, without the spatial constraints imposed by use of a straight taper.

The fiber-optic-taper loop probe as disclosed herein may be fabricated using polarization-maintaining optical fiber of any suitable type. A loop probe thus constructed may then be used for characterization of polarization dependent transverse-optical-coupling to and/or polarization-dependent optical properties of a transversely-optically-coupled optical component.

A variety of devices for modulating and/or routing optical signals in a fiber-optic transmission system rely on transverse optical coupling between a fiber-optic taper and another optical component (as in applications A1 through A14). A fiber-optic-taper loop structure as disclosed herein may be incorporated into such devices for transverse optical coupling to facilitate device assembly and/or packaging and to enhance device stability.

The present invention has been set forth in the forms of its preferred and alternative embodiments. It is nevertheless intended that modifications to the disclosed fiber-optic-taper loop probe may be made without departing from inventive concepts disclosed and/or claimed herein.

What is claimed is:

1. A method for characterizing an optical component adapted for transverse optical coupling, comprising the steps of:

positioning a fiber-optic-taper loop probe near the optical component so as to enable transverse-transfer of optical power between the loop probe and the optical component, wherein the loop probe comprises an optical fiber having a first fiber segment, a first tapering segment, a center taper segment, a second tapering segment, and a second fiber segment, the optical fiber being formed into a loop with the center taper segment positioned on the loop substantially opposite a crossing point of the loop, and at least one support member secured to the optical fiber at the first fiber segment, the first tapering segment, the second tapering segment, or the second fiber segment, wherein the support member serves to maintain the optical fiber in the loop and enables positioning of the loop probe relative to the optical component for transverse-coupling thereto;

applying an input signal to the optical component, the input signal including i) an optical input signal launched into the optical fiber and transmitted through the loop probe to the optical component, or ii) an electronic input signal applied to the optical component; and detecting and analyzing an output signal, the output signal including i) an optical output signal transmitted through the optical fiber from the loop probe, or ii) an electronic output signal from the optical component.

2. The method of claim 1, wherein the support member is secured to a positioner for positioning the loop probe relative to the optical component for transverse-coupling thereto.

3. The method of claim 2, wherein the positioner includes a three-axis translator.

4. The method of claim 2, wherein the positioner includes a rotator.

5. The method of claim 1, wherein the output signal includes an optical output signal arising from the optical component.

6. The method of claim 1, wherein the input signal includes an optical input signal launched into the optical fiber and transmitted through the loop probe past the optical component.

7. The method of claim 1, wherein:

the input signal includes an optical input signal launched into the optical fiber and transmitted through the loop probe past the optical component, and the output signal includes that portion of the optical input signal transmitted through the loop probe past the optical component.

8. The method of claim 1, wherein the input signal includes an electronic input signal applied to the optical component.

9. A method for characterizing multiple optical components on a common substrate, the optical components being adapted for transverse optical coupling, the method comprising the steps of:

a) positioning a fiber-optic-taper loop probe near a selected optical component so as to enable transverse-transfer of optical power between the loop probe and the selected optical component, wherein the loop probe comprises an optical fiber having a first fiber segment, a first tapering segment, a center taper segment, a second tapering segment, and a second fiber segment, the optical fiber being formed into a loop with the center taper segment positioned on the loop substantially opposite a crossing point of the loop, and at least one support member secured to the optical fiber at the first fiber segment, the first tapering segment, the second tapering segment, or the second fiber segment, wherein the support member serves to maintain the optical fiber in the loop and enables positioning of the loop probe relative to the optical component for transverse-coupling thereto;

b) applying an input signal to the selected optical component, the input signal including i) an optical input signal launched into the optical fiber and transmitted through the loop probe to the optical component, or ii) an electronic input signal applied to the optical component; and c) detecting and analyzing an output signal, the output signal including i) an optical output signal transmitted through the optical fiber from the loop probe, or ii) an electronic output signal from the optical component;

d) moving the loop probe from the selected optical component to a next optical component, the next optical component thereby becoming the selected optical component; and e) repeating steps a) through d) for multiple optical components on the substrate.

* * * * *